Feb. 28, 1967 W. N. POUNDSTONE 3,306,431
BELT CONVEYOR
Filed June 17, 1958 2 Sheets-Sheet 1
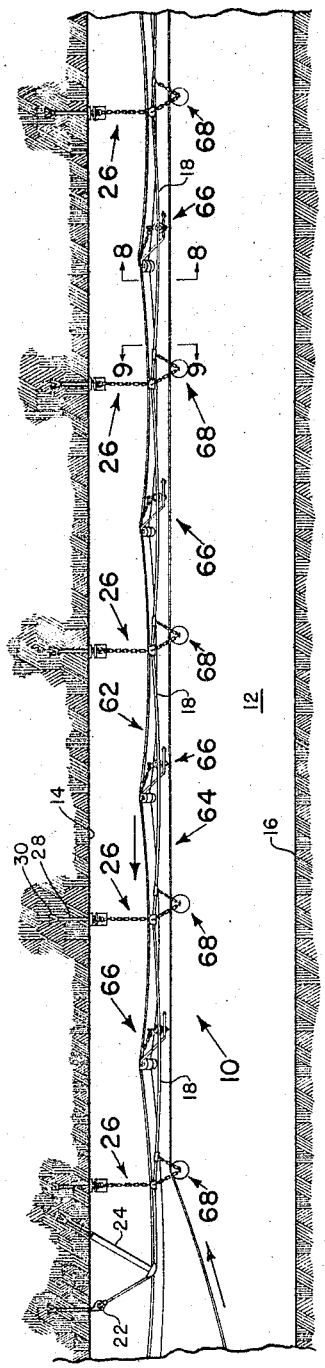
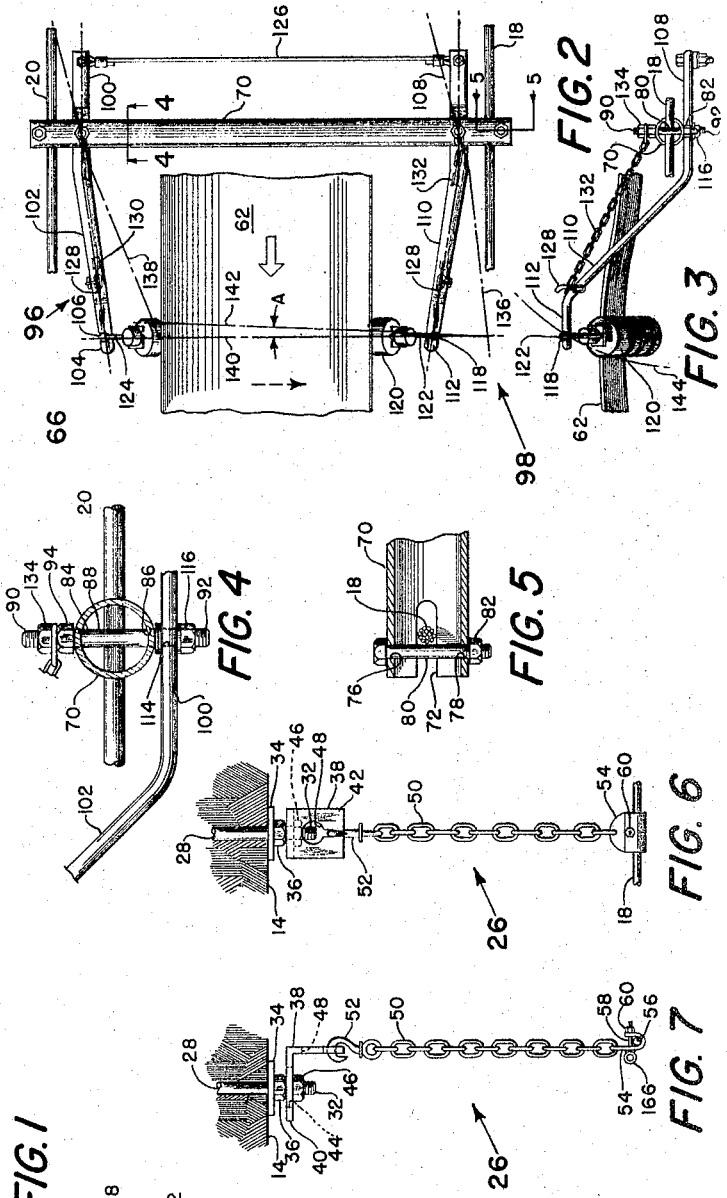
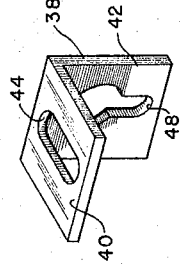
INVENTOR.
WILLIAM N. POUNDSTONE
BY
HIS ATTORNEY

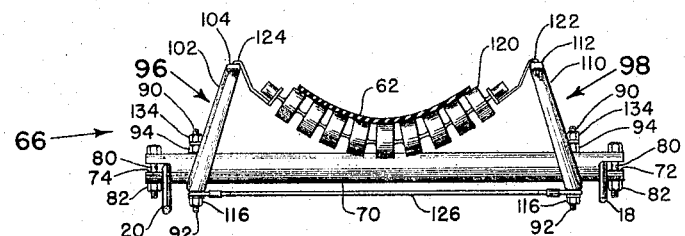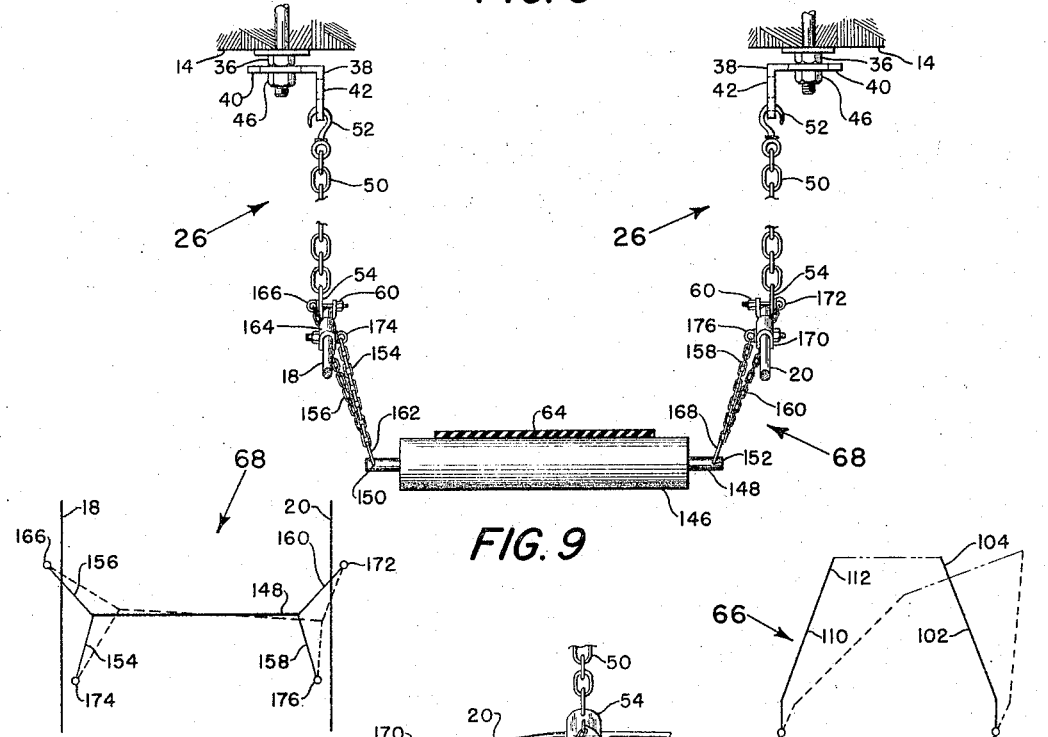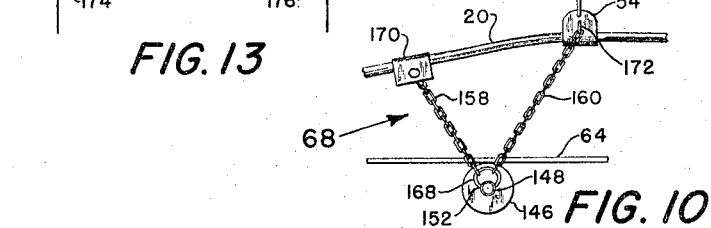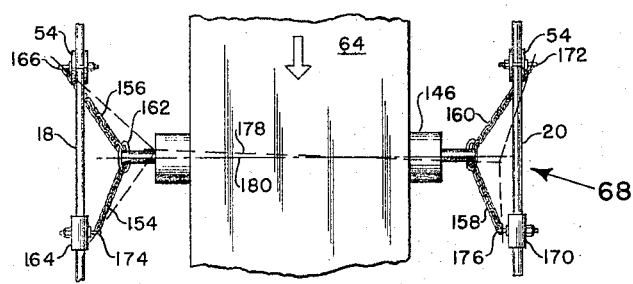

United States Patent Office 3,306,431
Patented Feb. 28, 1967

3,306,431
BELT CONVEYOR
William N. Poundstone, Morgantown, W. Va., assignor to Consolidation Coal Company, Pittsburgh, Pa., a corporation of Pennsylvania
Filed June 17, 1958, Ser. No. 742,580
4 Claims. (Cl. 198—192)

This invention relates to a flexible endless belt conveyor mechanism and more particularly to a flexible endless belt conveyor mechanism suspended from an overhead supporting means.

The endless belt conveyor having flexible strand type side frames has provided the mining industry with an improved apparatus for conveying mined material through the various haulageways to either the discharge terminus or to other haulage means. The flexible strand side frames absorb the shock of uneven load distribution of the material on the conveyor reach. The longitudinal oscillation or movement of the flexible strands and their lateral deflection toward each other contributes to this shock absorbing feature. It has been found that the flexible strand type conveyor materially reduces belt wear and provides a more dependable and inexpensive means of transportation.

The conventional flexible strand conveyors are supported intermediate their ends by a plurality of spaced stands. The stands in turn rest on the mine floor. The floor supported conveyors have several undesirable features that restrict their use underground. For instance, it is difficult to clean up spillage of material beneath this floor supported conveyor since the return reach is adjacent to the mine floor. Further, the floor supported conveyor mechanism takes up a majority of the floor space in the haulageway and restricts the area remaining to carry supplies through the haulageway to the mine face. This is particularly true where the conveyor mechanism is a relatively fixed installation in one of the main haulageways.

My improved endless belt conveyor mechanism includes a flexible strand conveyor that is supported from an overhead supporting structure. More particularly, the conveyor mechanism is positioned adjacent the mine roof and is supported therefrom. There is also provided a means to absorb the longitudinal movement of the flexible strands during the conveying of uneven loads of material on the conveying reach.

Further, my conveyor mechanism includes a means to adjust the fixed support relative to the mine roof so that the strands can be properly aligned along a predetermined course.

My improved conveyor system also includes a flexible troughed idler assembly which is secured to the flexible strands and movable therewith with the conveying reach supported by the flexible troughed idler assemblies. The troughed idler assemblies include a self-aligning means which automatically centers the conveying reach between the flexible strands and maintains the conveying reach in that position under various uneven lateral distribution of the load thereon. The self-aligning means moves the idler roller relative to the flexible strands when the belt deviates laterally from its normal course. This movement of the idler roller urges the belt in a lateral direction opposite to that of its deviation.

My conveyor mechanism includes also a means to support the return reach of the conveyor belt from the flexible strands. The return reach idler assemblies are also provided with a self-aligning means that maintains the return reach centered between the flexible strands.

Accordingly, the principal object of this invention is to provide a conveyor system having flexible strand side frames that are supported along their length from a fixed member positioned thereabove.

Another object of this invention is to provide flexible troughed idler assembly having self-aligning features.

Another object of this invention is to provide a return reach idler assembly adapted to be secured to a flexible strand and having self-aligning features.

A further object of this invention is to provide a supporting means for the flexible strand side frames which has a fixed portion adapted to be secured to the mine roof and a flexible portion adapted to absorb the longitudinal movement of the flexible strand side frames.

Still another object of this invention is to provide an overhead supporting means for a pair of flexible strand side frames that includes an adjustment means whereby the flexible strands may be trained or aligned along a predetermined course.

These and other objects and advantages of this invention will be more completely described and distinctly pointed out in the following specification, the accompanying drawings and the appended claims.

In the drawings:

FIGURE 1 is a fragmentary view in side elevation of a portion of my conveyor mechanism as it appears operatively positioned in a mine haulageway.

FIGURE 2 is a top plan view of a portion of the conveying reach illustrating my improved flexible troughed idler assembly.

FIGURE 3 is an enlarged view in side elevation of the flexible troughed idler assembly illustrated in FIGURE 2.

FIGURE 4 is a detailed fragmentary view in section of the flexible troughed idler assembly taken along the line 4—4 in FIGURE 2.

FIGURE 5 is another fragmentary view in section of a portion of the troughed idler assembly taken along the line 5—5 of FIGURE 2.

FIGURE 6 is a view in side elevation of one of the flexible strand supporting means.

FIGURE 7 is a view in front elevation of one of the flexible strand supporting means.

FIGURE 8 is a view in section taken along the line 8—8 in FIGURE 1 and illustrating in front elevation the flexible troughed idler assembly with the conveying reach positioned thereon.

FIGURE 9 is a view in section taken along the line 9—9 of FIGURE 1 and illustrating in rear elevation the return reach idler assembly with the conveyor return reach positioned thereon.

FIGURE 10 is an enlarged view in side elevation of the return reach idler assembly.

FIGURE 11 is a fragmentary top plan view of the conveyor belt return reach and the return reach idler assembly.

FIGURE 12 is a schematic view of the conveying reach idler assembly components.

FIGURE 13 is a schematic view of the return reach idler assembly components.

FIGURE 14 is an isometric view of strand aligning member 38.

Referring to the drawings and particularly to FIGURE 1, there is shown a flexible strand conveying mechanism generally designated by the numeral 10 positioned in a mine haulageway 12 having a roof 14 and a floor 16. The vertical dimension of the haulageway 12 is usually determined by the thickness of the mined material. In the illustration, a substantial distance is shown between the conveying mechanism 10 and the floor 16. It should be understood, however, that the conveying mechanism would operate with equal facility if this distance were substantially reduced.

The conveyor mechanism 10 includes a pair of flexible strands 18 and 20 which extend longitudinally in the haulageway 12. The strands 18 and 20 are positioned in spaced parallel relation to each other and are anchored at one end at 22. A strut member 24 extends downwardly from the roof to maintain the ends of strands 18 and 20 in proper spaced relation with the roof 14. In FIGURE 1 only one end of each of the flexible strands 18 and 20 is illustrated as anchored to the roof at 22. It should be understood, however, that the other end of this section of the flexible strands could be anchored to the roof in a similar manner or anchored to the head or loading section of the conveyor.

The flexible strands 18 and 20 are supported intermediate their end portions by means of a plurality of strand supports generally designated by the numeral 26. The strand supports 26 are illustrated in detail in FIGURES 6, 7 and 14 and include a roof bolt 28 having an expansible wedge member 30 which is adapted to rigidly secure the bolt 28 in the mine roof 14. The bolt 28 has a threaded end portion 32 which extends below the mine roof 14. A washer 34 is positioned around the bolt 28 and a nut 36 draws the bolt 28 downwardly and expands the expansible wedge member 30 to rigidly secure the bolt 28 in the mine roof.

The strand support 26 includes a strand aligning member 38 which is annular in shape and has a horizontal portion 40 and a vertical portion 42. The horizontal portion 40 has an elongated lateral slot 44 through which the bolt threaded end portion 32 extends. A second nut 46 secures the strand aligning member 38 to the roof bolt 28. The vertical portion 42 has a keyway shaped slot 48 therein. A chain 50 has a hook shaped end portion 52 which is positioned in the keyway slot 48 so that the strand aligning member 38 supports the depending chain 50 therefrom. The other end of the chain 50 has a strand securing member 54 secured thereto. The strand securing member 54 has a grooved portion 56 in which the flexible strands 18 or 20 are positioned. A bolt member 58 extends through aligned apertures in the strand securing member 54 above the flexible strand 18 to thereby secure the strand therein. A nut 60 is threadably secured to the bolt 58 and, when tightened, fixedly secures the flexible strand 18 to the strand securing member 54.

As previously stated, the flexible strand type side frames, which in this instance are strands 18 and 20, move longitudinally under conditions of uneven longitudinal load distribution on the conveying reach. The strand supports 26 absorb or take up this longitudinal movement by a pendulum-like action of the chains 50. The strand supports 26 therefore provide a flexible connection between the fixed portion of the strand supporting means and the flexible strands. It should be noted, however, with this arrangement that there is a complete absence of any friction between the flexible strands and their supporting means thereby completely eliminating any frictional wear that would result from the longitudinal movement of the strands relative to their supporting means.

In the initial layout of the course for the flexible strands 18 and 20 in the mine haulageway 12 the roof bolts 28 are inserted in the mine roof 14 substantially along a preselected course. The positioning of a roof bolt at a predetermined location is extremely difficult due to the type of machinery employed in drilling the roof bolt holes. The vibrations and deviation of the roof bolt hole drilling equipment and the conditions under which the drilling operation is performed contribute to this inaccuracy. In order for the conveying reach and return reach to follow a truly linear course it is desirable that the flexible strands extend along parallel linear paths and the flexible portion of the strands supports 26 depend from the roof in a substantially vertical plane. The strand aligning members 38 serve to assist in aligning the flexible strands 18 and 20 as follows. After the roof bolts 28 have been properly secured in the mine roof 14 and the strands 18 and 20 have been properly anchored at their end portions, the strand connecting member of each support 26 is then secured to the respective flexible strands. The roof bolt end portion 32 is then adjusted in the strand aligning member elongated slot 44 until the chains 50 depend therefrom in a substantially vertical plane. After this adjustment is accomplished, the nut 46 is tightened and the flexible strands 18 and 20 are trained along a predetermined linear course with the chains 50 depending in a substantially vertical plane from the mine roof 14.

The conveying mechanism 10 includes an endless flexible belt having a conveying reach generally designated by the numeral 62 and a return reach 64. The conveying reach 62 is supported along its length by a plurality of flexible troughed idler assemblies generally designated by the numeral 66. The return reach is similarly supported along its length by a plurality of return reach idler assemblies 68. Both the conveying reach idler assemblies 66 and return reach idler assemblies 68 are supported by the flexible strands 18 and 20 as will be later described.

The conveying reach idler assembly 66 is illustrated in detail in FIGURES 2, 3, 4, 5, 8 and 12. Referring to these figures, the conveying reach idler assembly 66, hereinafter called troughed idler assembly 66, includes a tubular spreader 70 which has as pair of longitudinal slots 72 and 74 adjacent its end portions (FIGURE 8). The slots 72 and 74 receive the flexible strands 18 and 20 therein. The spreader 70 has a pair of aligned vertical apertures 76 and 78 adjacent each end portion which receive a bolt 80 therethrough (FIGURE 5). A nut 82 is secured to the threaded end portion of bolt 80 and serves to secure the respective flexible strands 18 and 20 within the respective slots 72 and 74. Inwardly spaced from the vertical apertures 76 and 78 are other vertical apertures 84 and 86 (FIGURE 4). Bolts 88 having threaded end portions 90 and 92 extend through the respective apertures 84 and 86. A first nut 94 is secured to the upper threaded end portion 90.

A pair of idler roller supporting members 96 and 98 are pivotally secured to the spreader member 70. The roller supporting member 96 has a base portion 100 and a forwardly extending arm portion 102. The arm portion 102 is turned inwardly in respect to the base portion 100 as viewed in FIGURE 2. The arm portion 102 extends upwardly from the base portion 100 as viewed in side elevation (FIGURE 3). The roller support member arm 102 has a down turned end portion 104 with a lateral slot 106 therein.

The roller support member 98 also has a base portion 108 and an inwardly extending arm portion 110 as viewed in plan (FIGURE 2) with a down turned forward end portion 112. The roller support member arm 110 is bent upwardly relative to the base portion 108 as illustrated in FIGURE 3. The down turned portion 112 is turned so that it is substantially parallel to the base portion 108. The roller support member down turned portion 112 has a lateral slot 118 therein.

The roller support members 96 and 98 each have a vertical aperture 114 through their base portions (FIGURE 4). The bolts 88 which extend through the apertures 84 and 86 in the spreader member 70 also extend through the respective apertures 114 in the roller support base members 100 or 108. Nuts 116 are threadedly secured on the lower end portions 92 of bolts 88 and pivotally secure the roller supporting members 96 and 98 to the spreader member 70.

A flexible troughed idler roller 120 has hooked end portions 122 and 124 which rest in the respective roller support member slots 118 and 106. The hook and slot type of connection between the idler roller 120 and the roller support members 96 and 98 provides a hinge type connection between the roller support members 96 and 98 and the roller 120. With this arrangement the roller support members 96 and 98 may pivot relative to the spreader member 70 without restriction due to their connection to the idler roller 120. A flexible cable 126 is secured to the rear end portions of both roller support members 96 and 98. The cable 126 limits the inward movement of the roller support member end portions 104 and 112 toward each other. The cable 126 does not, however, restrict the movement of the roller support members 96 and 98 away from each other. Both of the arm members 102 and 110 have hooks 128 extending upwardly therefrom. A pair of chains 130 and 132 are secured at one end to the respective bolts 88 extending through apertures in the spreader 70. A second nut 134 secures the respective chains to the respective bolts 88. The other ends of the chains 130 and 132 are secured to the respective hooks 128. The effective length of the chains 130 and 132 may be changed by the selection of the link which extends around the hook 128.

In FIGURE 1 the arrow between the mine roof 14 and the conveying reach 62 indicates the direction of travel of the conveying reach. The direction of travel of the return reach 64 is opposite to that of the conveying reach 62. In FIGURE 2 the direction of travel of the conveying reach 62 is indicated by the arrow superimposed thereon. The roller support members 96 and 98 have their arm portions 102 and 110 extending in the direction of belt travel. As viewed in FIGURE 3 the arms extend upwardly so that the conveying reach 62 is supported above the flexible strands 18 and 20.

It should be noted that the roller support member arms 102 and 110 are turned inwardly toward each other in plan view. With this construction and arrangement the troughed idler roller assembly 66 has self-aligning features. The assembly tends to limit any lateral deviation of the conveying reach 62 in the following manner. As viewed in FIGURE 2 the conveying reach appears centered between the flexible strands 18 and 20. Assume the belt, because of uneven lateral load distribution or some other reason, tends to deviate toward the left from its normal course, which in the drawing would be in the direction indicated by the dotted arrow. The movement of the belt in this direction also urges the roller supporting members 96 and 98 in the same direction. This is indicated by the dash-dot-dash-dot lines 136 and 138 in FIG. 2. As previously stated, both roller support members 96 and 98 are pivotally secured to spreader member 70 so that they are free to pivot laterally in either direction. As the support members 96 and 98 pivot in the direction of belt deviation the arm end portion 104 moves inwardly toward the belt and the arm end portion 112 moves outwardly away from the belt. In doing so the longitudinal axis of the flexible troughed idler roller 120 deviates angularly as indicated by the angle A between the lines 140 and 142. The line 140 indicates the longitudinal axis of the idler roller 120 when the conveying reach 62 is in a centered position. The line 142 indicates the longitudinal axis of the idler roller 120 in its corrective position when the conveying reach 62 tends to deviate toward the left. In the corrective position as indicated by line 142 the idler roller deviates from a position normal to the direction of belt travel to a position where the end of the roller adjacent the side of belt deviation advances and thereby positions the longitudinal axis of the roller obliquely to the normal direction of belt travel and thereby urges the conveying reach 62 in a direction opposite to that of its lateral deviation and returns the conveying reach 62 to its centered position.

With the construction of the idler roller assembly illustrated in FIGURES 2 and 3 a further self-aligning feature is present. Referring to FIGURE 3, in the event of a substantial uneven lateral distribution of the load on the conveying reach the roller supporting member which is required to carry the largest amount of the proportionate load will tend to dip downwardly as illustrated by the curved dash-dot line 144 in FIGURE 3. The idler rollers because of their frictional engagement with the conveying reach attempt to direct the conveying reach upwardly along the inclined roller. As the arm moves downwardly along the arc 144 the longitudinal axis of the idler roller 120 will again deviate and thereby urge the belt toward a centered position.

To further illustrate the deviation of the longitudinal axis of idler roller 120, schematic FIGURE 12 is included and the respective components of the idler assembly 66 are given numerals similar to those in FIGURE 2.

The return reach idler assembly 68 is illustrated in FIGURES 9, 10, 11 and 13. The return reach idler assembly 68 includes an idler roller 146 having a roll shaft 148 extending therethrough on which the idler roller 146 rotates. The return reach 64 is supported by the idler roller 146. The roll shaft has a pair of horizontal apertures 150 and 152 adjacent its end portions. The roll shaft 148 is connected at one end to the flexible strand 18 by a pair of chains 154 and 156. The other end of the roll shaft 148 is connected to the flexible strand 20 by means of a second pair of chains 158 and 160. The chains 154 and 156 are connected at one end to a ring member 162 extending through the aperture 150 in the roll shaft 148. The other end of chain 154 is connected to a ring connector 174 of clamp 164 which in turn is secured to flexible strand 18. The chain 156 is connected to the outboard side of the strand securing member 54 by a suitable ring connector 166. The strand supporting member 54 in this instance is a portion of the flexible strand support 26. It should be noted, however, that the chain 156 could be connected to the strand 18 by means of a clamp similar to clamp 164. The chains 158 and 160 are similiarly secured to the roll shaft 148 at one end by a ring member 168 and the chain 160 is connected to a ring connector 172 of a clamp 54 which in turn is secured to flexible strand 20 and chain 158 is connected to the strand securing member 170 by a ring connector 176.

As illustrated in FIGURES 9, 10 and 11, the chains 156 and 160 are secured to the outboard sides of the strand securing member 54 by suitable ring connectors 166 and 172. The chains 154 and 158 are secured to the inboard side of the respective strands 18 and 20 by ring connectors 174 and 176. The chains 154 and 158 are of substantially the same length and less than the length of chains 156 and 160.

The return reach idler assemblies 68 also have belt aligning features. Although the return reach 64 is not a load carrying reach, the weight of the belt itself results in frictional contact between the belt 64 and the roller 146. Any deviation of the return reach 64 in a lateral direction exerts a lateral force on the idler roller 146. Because of the chain arrangement the lateral force in the direction of deviation exerted on the roller 146 urges the roller in the direction of deviation. Due to the chain arrangement as the roller moves laterally the axis of the idler roller 146 also changes to urge the return reach in a direction opposite to that of its deviation. The change of the longitudinal axis of the idler roller 146 is indicated by the dotted line 178 and the dot-dash line 180. Dot-dash line 180 indicates the longitudinal axis of the idler roller 146 when the return reach 64 is in a centered position. Dotted line 178 indicates the longitudinal axis of the return reach idler 146 as it urges the conveyor reach in a direction opposite to that of its lateral deviation.

FIGURE 13 illustrates the respective components of the return reach idler assembly 68 schematically. It should be noted in this figure that the chains 154 and 156 and their connections to the flexible strand 18 form a triangular plane with the roll shaft 148 connected at its apex. The base of the triangular plane extends from the connections 166 and 174. The base is not, however, parallel to the flexible strand 18. The chains 158 and 160 and their connections to the flexible strand 20 also form a triangular plane with the base extending between the respective connections 172 and 176. The base of the triangular plane formed by chains 158 and 160 is not parallel to the flexible strand 20. As the idler roller 146 coaxially arranged on roll shaft 148 deviates away from its centered position, both of the triangular planes formed by the respective chains and their connections pivot about their base line. Since the triangular planes are not parallel to the flexible strands the axes of the idler roller 146 and roll shaft 148 deviate to return the return reach 64 to its centered position, as described.

I claim:

1. In an endless conveyor having a conveying reach and a return reach the combination comprising a pair of spaced flexible strands, a plurality of flexible troughing idler assemblies spanning the distance between said strands for transferring the load on said conveying reach into said strands, said troughing idler assemblies including troughing idlers and means to position said troughing idlers above said flexible strands, intermediate supporting means for supporting said strands intermediate their end portions, said intermediate supporting means secured to and depending from a fixed member positioned above said strands, said intermediate supporting means having a flexible portion movable relative to said fixed member so that said flexible portion of said intermediate supporting means moves relative to said fixed member as said flexible strands move under conditions of uneven load distribution on said conveying reach, a plurality of return reach idler rollers spanning the distance between said strands, said return reach idlers adapted to support said conveyor return reach and transfer the load thereof into said flexible strands, said return reach idlers secured to and depending from said strands.

2. In an endless belt conveyor as set forth in claim 1, said flexible strand intermediate supporting means including means to adjust said flexible portion laterally relative to said strands to thereby provide aligning means for said strands along a predetermined course.

3. In an endless belt conveyor having a conveying reach the combination comprising a pair of spaced flexible strands, flexible troughing idler assemblies spanning the distance between and connected to said strands for transferring the load on said conveying reach into said strands, intermediate supporting means for supporting said flexible strands intermediate their end portions, said intermediate supproting means secured to and depending from a fixed member positioned above said strands, said intermediate supporting means having a portion movable relative to said fixed member so that said supporting means portion moves relative to said fixed member as said flexible strands move longitudinally under conditions of uneven load distribution on the conveying reach, each of said flexible troughing idler assemblies including a pair of idler roller supporting members positioned in spaced relation to each other and having front end portions and rear end portions, supporting means for said roller supporting members secured to and extending laterally between said pair of spaced flexible strands, said roller supporting members each pivotally secured to said supporting means intermediate said end portions, a flexible troughed idler roller connected to both of said roller supporting members adjacent said front end portions and extending therebetween, and a spacer member connected to said supporting members adjacent said rear end portions, said supporting members adapted to pivot relative to said supporting means upon lateral deviation of said conveying reach supported by said idler roller so that said idler roller urges said conveying reach in a direction opposite to said lateral deviation.

4. In an endless belt conveyor having a return reach the combination comprising a pair of spaced flexible strands, intermediate supporting means for supporting said flexible strands intermediate their end portions, said intermediate supporting means secured to and depending from a fixed member positioned above said strands, said intermediate supporting means having a portion movable relative to said fixed member so that said supporting means portion moves relative to said fixed member as said flexible strands move longitudinally, a plurality of return reach idler roller assemblies spanning the distance between said strands, said idler roller assemblies including idler roller means, shaft means extending coaxially through said roller means, said idler roller means being rotatable relative to said shaft means, said shaft means having a connecting means adjacent each end, first and second members connected at one end to said shaft connecting means, third and fourth members connected to the other of said connecting means, said first member pivotally connected to one of said flexible strands, said second member pivotally connected to said same strand in spaced relation to said first member longitudinally along said flexible strand and spaced laterally from said first member, said third member pivotally connected to said other flexible strand, and said fourth member pivotally connected to said last named flexible strand in spaced relation to said third member longitudinally along said last named flexible strand, said members adapted to pivot relative to said flexible strands upon lateral deviation of said return reach supported by said idler roller means so that said idler roller urges said return reach in a direction opposite to said lateral deviation.

References Cited by the Examiner

UNITED STATES PATENTS

| 909,833 | 1/1909 | Vrooman | 198—192 |
|---|---|---|---|
| 1,076,337 | 10/1913 | Vogel | 104—126 X |
| 1,397,368 | 11/1921 | Derungs | 104—112 |
| 1,807,229 | 5/1931 | Thorness. | |
| 2,451,394 | 10/1948 | Klein | 198—202 |
| 2,613,802 | 10/1952 | Chapman. | |
| 2,773,257 | 12/1956 | Craggs et al. | 198—192 |
| 2,842,257 | 7/1958 | Craggs et al. | |
| 2,896,774 | 7/1959 | Long et al. | 198—202 |
| 2,922,512 | 1/1960 | Lo Presti | 198—192 |

FOREIGN PATENTS

| 663,493 | 8/1929 | France. |
|---|---|---|
| 1,088,557 | 3/1955 | France. |
| 240,642 | 8/1910 | Germany. |
| 738,598 | 9/1953 | Germany. |

EVON C. BLUNK, *Primary Examiner.*

HUGO O. SCHULZ, JULIUS E. WEST, SAMUEL LEVINE, WILLIAM B. LABORDE, EDWARD A. SROKA, *Examiners.*

G. M. FORLENZA, W. A. SCHUETZ,
*Assistant Examiners.*